Figure 1:
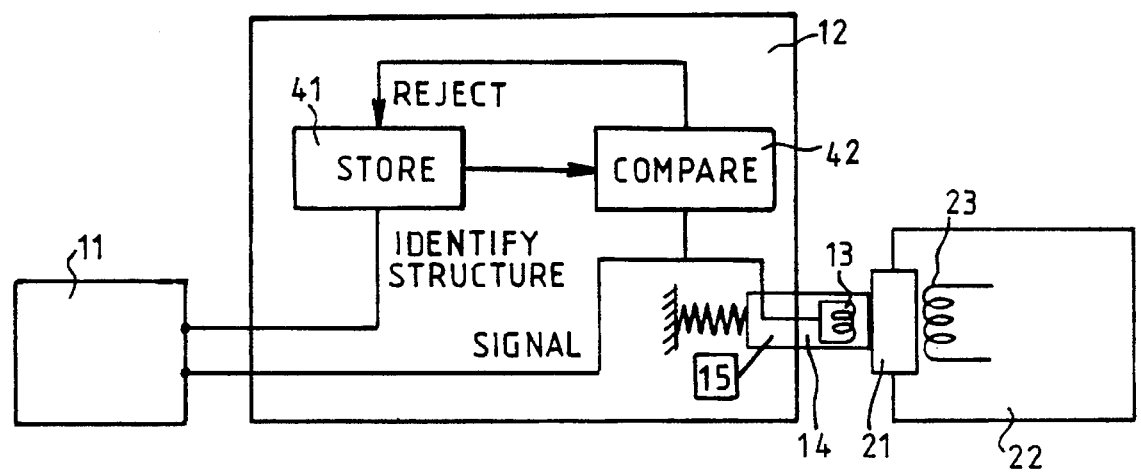

United States Patent

Byford et al.

[11] Patent Number: 5,523,751
[45] Date of Patent: Jun. 4, 1996

[54] READING OF METERS

[75] Inventors: Peter Byford, Hampshire; Roger Allcorn, Gwent, both of United Kingdom

[73] Assignee: Thames Water Utilities Limited, Berkshire, United Kingdom

[21] Appl. No.: 231,719

[22] Filed: Apr. 22, 1994

[30] Foreign Application Priority Data

Apr. 22, 1993 [GB] United Kingdom .................. 9308380

[51] Int. Cl.⁶ .................................................. G08B 23/00
[52] U.S. Cl. ................................. 340/870.02; 340/870.03; 340/870.07; 340/870.11; 364/481; 364/483; 324/103 R
[58] Field of Search ............................ 340/870.02, 870.07, 340/870.03, 870.06, 870.11; 395/575, 500; 346/173, 176; 364/464.04, 481, 483; 324/103 R, 142, 115

[56] References Cited

U.S. PATENT DOCUMENTS

| | | | |
|---|---|---|---|
| 4,749,992 | 6/1988 | Fitzmeyer et al. | 340/870.02 |
| 4,963,820 | 10/1990 | Medlin | 324/103 R |
| 5,079,715 | 1/1992 | Venkataraman et al. | 340/870.02 |
| 5,162,725 | 11/1992 | Hodson et al. | 324/115 |

FOREIGN PATENT DOCUMENTS

WO94/22238  9/1994  WIPO .

*Primary Examiner*—John K. Peng
*Assistant Examiner*—Ashok Mannava
*Attorney, Agent, or Firm*—Lowe, Price, LeBlanc & Becker

[57] ABSTRACT

A meter reader 12 analyzes a signal from a meter 22 and compares its structure with a plurality of known signal structures stored in a memory 41. If the comparison shows that a particular one signal structure stored in the memory is inconsistent with the data signal being received, that structure is rejected and not used in future comparisons as the receipt of the data signal progresses. Eventually, the non-rejected signal structures should be reduced to a single structure which by elimination must be the closest structure to that of the signal being read. The meter reader can then pass the received data signal and the identification of its particular signal structure to further processing apparatus 11 such as a signal recorder or signal display and can arrange this recording or display so that parts of the signal representing different properties can be arranged consistently with other data signals which may be of different structures.

8 Claims, 2 Drawing Sheets

1111 0101 0 1101 0 1010 0 1001 00000 101 0 110 0 010 1111

1111 010 0 110 0 010 00000 0101 0 1010 0 0101 0 1111 1111

1111 1010 0 0101 0 1111 0 1100 0 1000 00000 101 0 011 0 110 1111

READING OF METERS

In the reading of meters, it has long been desired to cut out the step of a human meter reader observing the display on a meter and noting the count displayed in a logbook. Furthermore, it has also long been desired to enable the meter to be read without gaining access to the premises on which the meter is located.

Apparatus has been designed for both these purposes but special apparatus has been required to suit each type of meter. It is the purpose of the present invention to provide apparatus which can be used in conjunction with different types of meter. According to the invention there is provided a meter reader comprising means for receiving a data signal from a meter, a memory for storing a plurality of data signal structures, means for comparing the structure of said data signal with said plurality and means for selecting one of said stored structures to be appropriate to said data signal following an acceptable comparison of the structure of the received data signal and the appropriate structure from said memory.

Once the identification signal has been generated it can be used to select a suitable matching circuit for reading further data signals from the same meter. The combination of data signal and identification signal can be passed to further data processing apparatus, such as a recorder, that apparatus possibly responding to the identification signal to select a suitable matching circuit for reading the accompanying data signal.

It will be seen that the meter reader of the present invention does not require any special modification to be made to the meter which it is intended to read, provided that the meter is adapted to produce data signals when required. This may be arranged simply by manually depressing a button on the meter, or the meter may be constructed to respond to an interrogation signal generated by the reader or to the presence of the meter reader at a given position relative to the meter. Such arrangements are described in our International Patent Application PCT/GB94/00551.

Figure 2:
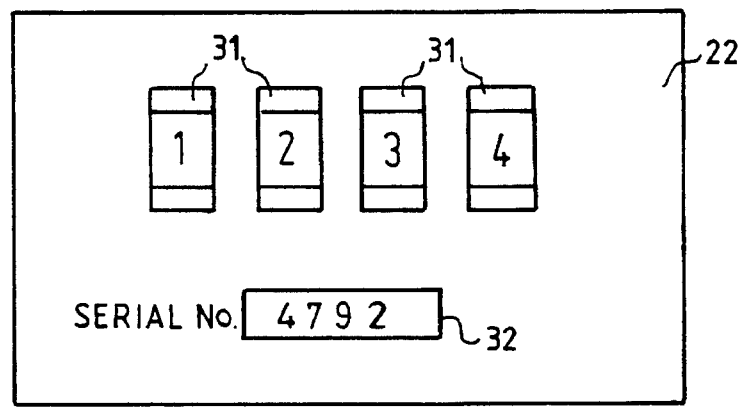
Figures 3, 4, 5, 6:
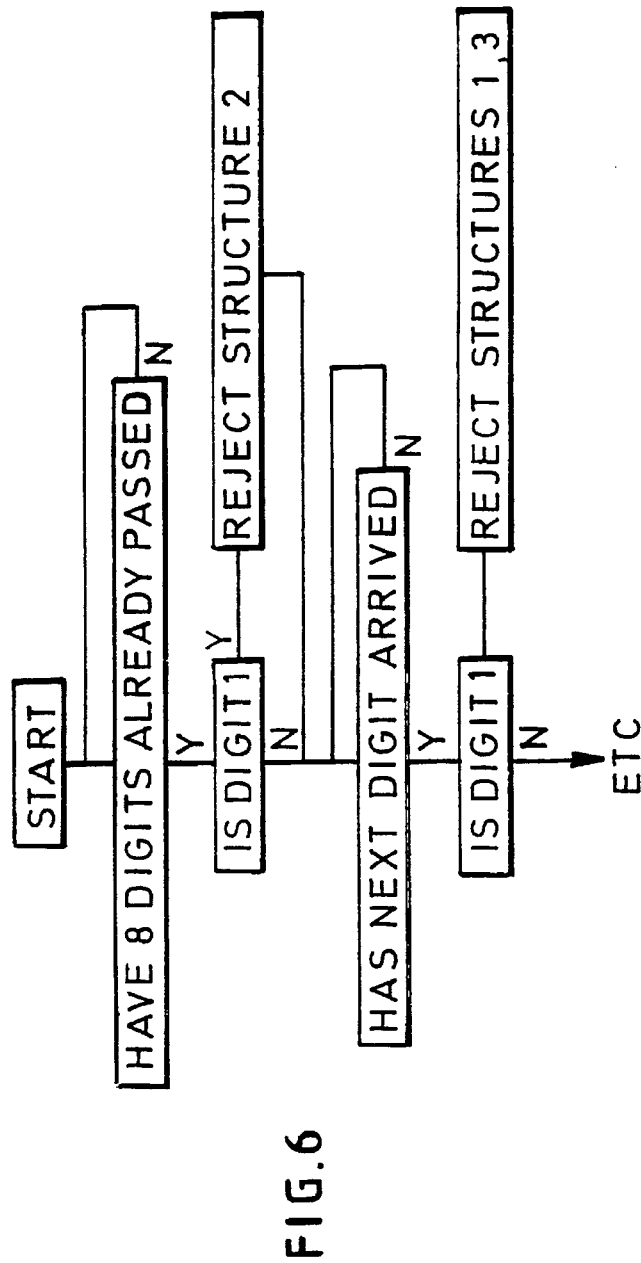

An example of the invention will now be determined with reference to the accompanying drawings in which:

FIG. 1 is a block diagram of meter reading apparatus in conjunction with a meter, FIG. 2 is a block diagram of a data display of the meter of FIG. 1, FIGS. 3 to 5 represent different data signal structures, and FIG. 6 is a flow diagram of a simplified comparison procedure for use with the data structures and apparatus of the above figures.

Apparatus for recording meter readings comprises a processing device 11, such as a display, a cassette recorder or solid state memory, and a meter reader in the form of a probe 12, as is illustrated in greater detail in our International Patent Application PCT/GB94/00551. The probe comprises a coil 13 on a depressible plunger 14 fitted with a Hall Effect switch 15. When the probe is moved into contact with the face plate 21 of a meter 22, the plunger 14 is depressed by contact with the face plate and operates the switch 15. The operated switch connects for a given period an interrogation signal to the coil 13 which is inductively coupled to a coil 23 in the meter behind the face plate 21 when the plunger 14 is in contact therewith. The meter coil 23 receives the interrogation signal and after the given period causes the meter reading to be generated as a data signal in the face plate coil 23 which signal is transferred by the inductive coupling to the coil 13 in the probe and from that coil 13 to processing circuits in the apparatus 12.

In the ideal world, the data signals generated by all meters would have a standard structure. However, in practice, meters made by different manufacturers generate data signals of different structures. The purpose of the probe described is to be able to read and identify data signals from a plurality of known meters.

A simple meter may have dials 31 registering the number of units, tens, hundreds and thousands of utility consumed. Each number can have any one of the integral values 0–9. The data signal may also include the serial number of the meter 32, for identifying the customer to be charged. One structure of data signal may, for example, include five binary ones to identify the start of the signal, followed by four four-digit binary numbers corresponding to the four dial positions with a binary zero between each of the four numbers followed by five binary zeros to identify the change from dial values to serial number, followed by three three-binary-digit numbers representing the serial number with a binary zero between each of the three numbers, followed by five binary ones to identify the end of the signal.

A second structure of a data signal from a meter of a different manufacturer may have five binary ones to identify the start of the signal, followed by three three binary digit numbers representing the serial number with a binary zero between each of the three numbers, followed by five binary zeros to identify the change from serial number to dial values followed by four four-digit binary numbers corresponding to the four dial positions with a binary zero between each of the four numbers followed by five binary ones to identify the end of the signal. A third structure of a data signal from a meter of yet another manufacturer may have signals corresponding to five dials rather than four and may have eight four binary digit numbers as the serial number, the format otherwise following the first structure. These three structures are illustrated in FIGS. 3–5 with the start identifying signal at 31, the dial position signals at 32, the intermediate changeover at 33, the serial number digits at 34 and the end identification at 35.

The meter reader has a store 41 in which each known meter data signal structure is stored. A comparator 42 compares each digit in the data signal from the coil 13 with each stored structure in turn to see whether it fits. If it is found not to fit one of the stored structures, that one structure is excluded from further comparisons as further digits of the signal train are received. Eventually all but one of the stored structures should be rejected, and when only one is left, the reader generates at 43 the identification signal appropriate to the remaining structure and adds it to the data signal which is passed to the processing device 11. The processing device can then allocate various digits from the data signal to appropriate compartments, so that no matter where the dial reading digits occur in a structure, they will always end up in the correct compartments and similarly for the serial number digits.

As the data signal train is received, the comparison device will not exclude any stored structure from the comparison process during receipt of the first five digits, because all three of our exemplary structures have five binary ones at the beginning of the data signal, as will be seen from FIGS. 3 to 5. Similarly the next three binary digits will not cause exclusion of any stored structure from the comparison process, because in all structures these digits can be either 1 or 0. If the ninth digit is a binary 1, then the second structure (of FIG. 4) is excluded from further comparison because its structure requires a 0 at this point to mark the division between the first and second three-binary digit number of the serial number. If the ninth digit is a binary 0, as it may well do as the final binary digit of the first dial number of the first and third structure, the second structure will continue to be included as the possibly correct structure. If the tenth digit is a binary 1, then both the first and third structures will be excluded, because they required a 0 at this point to mark the division between the first and second dial numbers. If the tenth digit is a binary 0, the comparisons continue. Similarly the second structure will be excluded (if it has not already been so) if any of the thirteenth, seventeenth and twenty-first digits are binary ones.

The first and third structures require the tenth, fifteenth, twentieth, etc. digits to be binary zeros, and so they will be excluded if any of these digits are binary ones.

Discrimination between the first and third structures will occur at the twenty-sixth digit. Structure 1 requires this to be a zero, the second zero of the five separating the dial and serial numbers. Structure 3 has this digit as the first binary digit of the fifth dial number which could be one or zero. If it is zero, structure 1 will then be excluded. If not, the comparison continues.

This example is simplified, and in practice there may be many more than three structures to compare and the data signal may include many different value digits and identification digits. Since data transmission is subject to errors, it may be prudent only to exclude a particular structure from future comparisons after it has been found not to fit at two or more digits of the received data signal.

A full flow diagram, even for our simplified example, would be very complicated. FIG. 6 shows the first few steps in the comparison procedure described above.

We claim:

1. A meter reader for reading a plurality of different types of meter comprising:

means for receiving a data signal from a meter, the data signal having a predetermined structure;

a memory for storing a plurality of data signal structures each corresponding to a different type of meter;

means for comparing the structure of the received data signal with the stored plurality of data signal structures to determine whether one of the stored plurality of data signal structures corresponds to the structure of the received data signal; and means for selecting the stored data signal structure determined to correspond to the structure of the received data signal.

2. The meter reader according to claim 1, further comprising means for excluding a stored data signal structure from future comparisons with the received data signal after a result of comparing is disagreement.

3. The meter reader according to claim 1, further comprising means for excluding a stored data signal structure from future comparisons with the received data signal after a plurality of results of comparing are disagreement.

4. The meter reader according to claim 1, further comprising a data signal processor for recording the received data signal, the data signal processor being responsive to the selected stored data signal structure to process the received data signal in a manner appropriate to the selected stored data signal structure.

5. The meter reader according to claim 4, wherein the received data signal has a predetermined number of bit positions and the data signal processor is a recorder, the recorder, in response to the selected stored data signal structure, selecting first bit positions of the received data signal representing a first property and second bit positions of the received data signal, different from the first bit positions, representing a second property, the first and second bit position being independent of their order in the received data signal.

6. In a meter reading apparatus comprising a processing device, a memory connected to the processing device, coupling means coupled to the processing device, and comparing means connected to the memory and coupling means, a method of reading data from a plurality of different types of meters comprising the steps of:

storing in the memory a plurality of data signal structures each corresponding to a different type of meter;

receiving a data signal from a meter via the coupling means, and providing the data signal to the comparing means and the processing device, the received data signal having a predetermined structure;

comparing the structure of the received data signal with the stored plurality of data signal structures and determining whether one of the stored plurality of data signal structures corresponds to the structure of the received data signal;

selecting the stored data signal structure determined to correspond to the structure of the received data signal; and processing the received data signal in a manner appropriate to the selected stored data signal structure.

7. The method according to claim 6, further comprising the step of excluding a stored data signal structure from future comparisons with the received data signal after a result of comparing is disagreement.

8. The method according to claim 6, further comprising the step of excluding a stored data signal structure from future comparisons with the received data signal after a plurality of results of comparing are disagreement.

* * * * *